United States Patent Office 3,488,210
Patented Jan. 6, 1970

3,488,210
CELLULOSIC GRAFT POLYMERIZATION PROCESS WITH SUPPRESSION OF HOMOPOLYMER FORMATION
Joseph M. Kuzmak, Media, Pa., and William W. Robinson, Claymont, Del., assignors to FMC Corporation, Philadelphia, Pa., a corporation of Delaware
No Drawing. Filed Nov. 3, 1966, Ser. No. 591,693
Int. Cl. B44d 5/12; C08d 13/16
U.S. Cl. 117—56                                        6 Claims

ABSTRACT OF THE DISCLOSURE

A process of graft polymerizing ethylenically unsaturated monomers onto a cellulosic backbone polymer with the utilization of a polyoxyalkylene derivative of an ester of a fatty acid and a hexitol to suppress homopolymer formation is disclosed herein.

---

The production of cellulose graft polymers generally results in articles having different surface characteristics than the original cellulose article or than similar articles prepared from synthetic polymers produced from the monomers used in the grafting process. The degree of difference depends on the amount of add-on of the polymerized monomer, and the particular monomer or monomers used in the grafting process.

The compositions used to modify the surface characteristics of articles such as fibers and films of cellulose and cellulosics have not been found satisfactory for the cellulose graft polymers. Furthermore, the compositions ordinarily used to modify the surface characteristics of synthetic resin articles are also unsatisfactory. These surface modifiers include, for example, additives and finishes for filaments and yarns and additives and overlaps for films and tubes.

A particularly difficult problem is encountered in the production of cellulose graft polymer staple fiber. It is usually difficult to obtain filament-free fibers, i.e., there frequently is some cementation of the filaments. This effect varies depending on the monomer being grafted. For example, styrene-methyl methacrylate copolymers yield a product having cemented filaments. One would expect that a fiber finish composition could be used to counter the cementing effect, but a large number of finishes which were applied to the cellulose fibers promoted the formation of undesirable homopolymer in the grafting process.

It is an object of this invention to provide a method of producing cellulose graft polymer articles having modified surface characteristics.

It is a further object of this invention to provide a method of producing cellulose graft polymer articles having modified surface characteristics and at the same time suppressing the formation of homopolymer.

It is still a further object of this invention to provide a method of preparing cellulose graft polymer stable fibers which are substantially free of cementation, have a desirably smooth and soft hand, and retain these properties even after washing.

These and other objects are accomplished in accordance with this invention which is a method of preparing cellulose graft polymers by first applying a graft polymerization initiator to a shaped cellulose article and then treating said article with an aqueous medium containing at least one ethylenically unsaturated polymerizable monomer in the presence of a polyoxyalkylene derivative of $C_8$–$C_{30}$ fatty acid ester of a hexitol in an amount sufficient to suppress homopolymer formation.

The initiators which are useful for this invention are those which will promote the formation and grafting, from said ethylenically unsaturated monomers, of polymer chains onto the cellulose backbone polymer. Examples of these initiators include the ceric ion compounds such as disclosed by Mino and Kaizerman in U.S. Patent No. 2,922,768, issued Jan. 26, 1960, particularly ceric nitrate, ceric sulfate, ceric ammonium nitrate, ceric ammonium sulfate, ceric ammoniun pyrophosphate, ceric iodate, ceric salts of organic acids and the like; the cobaltic salts such as cobaltic sulfate; the manganic salts such as manganic sulfate, manganic chloride, and manganic pyrophosphate; the alkali metal salts of oxygen acids of halogens such as sodium chloride, sodium periodate ($Na_5IO_6$), sodium bromate, potassium bromate, and the like; the free-radical initiators such as the ammonium, alkyl, aryl and acyl peroxides, persulfates, perborates, percarbonates and periodates, hydrogen peroxide, peracetic, perbenzoic and peroxylactic acids, azo-bis(isobutyronitrile), and the like. The above initiators may be used alone or, conventionally, in combination with various activators such as compounds incorporating reducing cations, e.g., ferrous, chromous, manganous, cuprous, titanous, silver ion, and the like, alkali metal sulfites, bisulfites, hyposulfites, hydrosulfites, and thiosulfates, sulfur dioxide, sulfurous acid, paratoluene sulfinic acid and the like.

The amount of graft polymerization initiator which is useful for this invention ranges from about 0.05 to about 25%, preferably from 0.25 to 5%, based on the weight of the cellulosic article to be treated therewith.

As previously stated, the cellulosic article is first treated with the initiator and then with the monomer in an aqueous medium. If the initiator is incorporated in the aqueous medium, it has been found that homopolymer formation is not suppressed and the finish effect is not as good.

The cellulosic article which is used for this invention is a cellulose or water-insoluble cellulose derivative material. For example, regenerated cellulose fibers and films, cotton, hydroxyethyl cellulose fibers and films, cellulose acetate fibers and films, and the like. A preferred material is regenerated cellulose staple fiber.

Ethylenically unsaturated polymerizable monomers of this invention are used alone or in mixtures with themselves in any desired proportion. Examples of these monomers include acrylonitrile, methacrylonitrile, acrylamide, methacrylamide, alkylacrylates, alkyl methacryates, acrylic acid, methacrylic acid, chloroacrylic acid, styrene, methyl styrene, dimethyl styrene, chlorostyrene, acetaminostyrene, vinyl halides, vinyl esters, vinyl ethers, vinyl ketones, vinylidene halides, vinyl pyridines, vinyl pyrrolidones, vinyl alkylethers, divinyl sulfone, maleic acid, itaconic acid, fumaric acid, dialkyl maleates, dialkyl furmarates, butadiene, isoprene, haloprenes, ethylene, propylene, butylene, isobutylene, allyl esters, substituted allyl esters, allyl alcohol, and the like. These monomers are dissolved or dispersed in the aqueous medium used for treatment of the cellulosic article in amounts ranging from about 0.01 to 20%, preferably from 0.5% to 8%, based on the weight of the aqueous medium.

The polyoxyalkylene derivative of the $C_8$–$C_{30}$ fatty acid ester of a hexitol used for this invention to provide cellulose graft polymer articles having modified surface characteristics while suppressing homopolymer formation during the polymer grafting step includes mono- and partial esters having appendant polyoxyalkylene chains ranging in alkylene oxide units from about 3 to about 100. The alkylene oxide usually contains 2 or 3 carbon atoms.

The fatty acid portion of the ester is derived, for example, from saturated or unsaturated acids including caprylic, pelargonic, capric, lauric, myristic, palmitic, margaric, stearic, oleic, linoleic, linolenic, arachidic, behenic, cerotic, melissic and the like. Esters derived from mixtures of fatty acids obtained from animal or vegetable oils are also included herein.

The hexitol of this invention is preferably sorbitol, but mannitol and dulcitol are also included. From the standpoint of superior homopolymer suppression, polyoxyethylene sorbitol oleate is a preferred material.

The polyoxyalkylene hexitol fatty acid ester is preferably incorporated in the aqueous monomer medium in an amount ranging from about 0.05 to 5%, preferably from 0.1 to 1%, based on the weight of said medium. However, the polyoxyalkylene hexitol fatty acid ester is alternatively incorporated in or on the cellulosic article, prior to the introduction thereof into the aqueous monomer medium.

The following examples are set forth to demonstrate this invention.

EXAMPLES I-V

Rayon staple fibers were immersed in a 0.5% aqueous solution of ceric ammonium nitrate for 10 minutes. Excess solution was removed by centrifugation. The staple was then immersed in an aqueous monomer solution or emulsion with or without a small percentage of Arlatone T, a polyoxyethylene derivative of the sorbitol ester of oleic acid, marketed by Atlas Chemical Company, for various lengths of time. The particular conditions and results for these reactions are given in the following table.

TABLE I

| Example No.: | Monomer | Percent in solution or Emulsion | P.S.O.E.[1] percent | Temp., °C. | Time, min. | Percent Add-On | Homo-polymer |
|---|---|---|---|---|---|---|---|
| 1 | Acrylonitrile | 7 | 1 | 27 | 20 | 44 | None. |
| 2 | do | 7 | 0 | 27 | 20 | 41 | Much. |
| 3 | Styrene-MMA[2] | 3-3 | 0.5 | 50 | 45 | 67 | None. |
| 4 | Styrene-MMA | 3-3 | 0.25 | 50 | 45 | 77 | Do. |
| 5 | do | 3-3 | 0 | 50 | 45 | 80 | Some. |

[1] P.S.O.E.=Polyoxyethylene Sorbitol-Oleic Acid Ester.
[2] MMA=Methyl Methacrylate.

The cellulose graft polymer staple fibers of Examples 1, 3 and 4 were very filament-free, soft, slippery, and hydrophilic. They showed very obvious improvement in surface characteristics over fibers of Examples 2 and 5 when hand carded. The fibers of Example 5 were also slightly cemented.

The finish effect which is obtained with the present invention persists even after thorough washing of the fibers in water or soap and water.

EXAMPLES VI-VII

Rayon staple was immersed in an aqueous bath containing 2.5% ceric ammonium nitrate, and 4% acrylonitrile monomer. This bath was used with and without Arlatone T. The following table shows the results of these experiments.

TABLE II

| Example No. | Percent P.S.O.E.[1] | Percent Add-On | Homopolymer |
|---|---|---|---|
| 6 | 0 | 90 | Much. |
| 7 | 1 | 115 | Do. |

[1] P.S.O.E.=Polyoxyethylene Sorbitol-Oleic Acid Ester.

The above table demonstrates that the incorporation of the graft polymer initiator in the aqueous monomer medium produces unsatisfactory results with respect to suppression of homopolymer. In addition, the overall "hand" is not as good as that obtained in Examples 1, 3 and 4.

Various changes and modifications may be made in practicing the invention without departing from the spirit and scope thereof, and therefore, the invention is not to be limited except as defined in the appended claims.

We claim:
1. A method of preparing a cellulose graft polymer comprising first applying a graft polymerization initiator to a shaped cellulosic article in an amount sufficient to promote grafting of an ethylenically unsaturated polymerizable monomer onto said cellulosic article, and then treating said article with an aqueous medium containing at least one ethylenically unsaturated polymerizable monomer in the presence of a polyoxyalkylene derivative of an ester of a $C_8$-$C_{30}$ fatty acid and a hexitol in an amount sufficient to suppress homopolymer formation.

2. The method of claim 1 wherein the ester derivative is the polyoxyethylene derivative of the ester of oleic acid and sorbitol.

3. The method of claim 1 wherein the ester derivative is incorporated in the aqueous medium containing the monomer.

4. The method of claim 1 wherein the initiator is a ceric salt applied in an aqueous medium.

5. The method of claim 1 wherein the monomer is acrylonitrile.

6. The method of claim 1 wherein the monomer is styrene.

References Cited

UNITED STATES PATENTS

| 2,922,768 | 1/1960 | Mino et al. | 260—17.4 |
| 2,955,015 | 10/1960 | Segro et al. | 8—116 |
| 3,027,346 | 3/1962 | Rugg et al. | 117—145 X |
| 3,044,972 | 7/1962 | Segro et al. | 260—17.4 X |
| 3,046,078 | 7/1962 | Salsbury et al. | 117—145 X |
| 3,065,041 | 11/1962 | Suen | 8—116 |
| 3,101,276 | 8/1963 | Hendricks | 117—145 X |
| 3,372,132 | 3/1968 | Cruz | 260—17.4 |

FOREIGN PATENTS

| 884,805 | 12/1961 | Great Britain. |
| 942,971 | 11/1963 | Great Britain. |
| 1,000,082 | 8/1965 | Great Britain. |

WILLIAM D. MARTIN, Primary Examiner

M. R. LUSIGNAN, Assistant Examiner

U.S. Cl. X.R.

8—116, 116.2; 117—118, 143, 145; 260—17.4